United States Patent
Kang et al.

(10) Patent No.: US 7,502,179 B2
(45) Date of Patent: Mar. 10, 2009

(54) FIXED-FOCUS LENS

(75) Inventors: Yi-Hao Kang, Hsinchu (TW); Kai-Yun Chen, Hsinchu (TW)

(73) Assignee: Young Optics, Inc., Hsinchu (TW)

( * ) Notice: Subject to any disclaimer, the term of this patent is extended or adjusted under 35 U.S.C. 154(b) by 40 days.

(21) Appl. No.: 11/858,626

(22) Filed: Sep. 20, 2007

(65) Prior Publication Data

US 2008/0304165 A1 Dec. 11, 2008

(30) Foreign Application Priority Data

Jun. 7, 2007 (TW) .............................. 96120516 A (51) Int. Cl.
*G02B 13/04* (2006.01)
*G02B 9/12* (2006.01)

(52) U.S. Cl. ...................................... 359/749; 359/784

(58) Field of Classification Search ................. 359/749, 359/750, 751, 752, 753, 754, 784
See application file for complete search history.

(56) References Cited

U.S. PATENT DOCUMENTS

| | | | |
|---|---|---|---|
| 6,452,728 B2 | 9/2002 | Shikama | |
| 6,560,041 B2 | 5/2003 | Ikeda et al. | |
| 6,577,455 B2 | 6/2003 | Shikama | |
| 7,057,825 B2 | 6/2006 | Kobayashi | |
| 7,075,727 B2 | 7/2006 | Jeon et al. | |
| 7,423,819 B1* | 9/2008 | Chuang et al. | 359/753 |
| 2007/0268598 A1* | 11/2007 | Kang et al. | 359/716 |

* cited by examiner

*Primary Examiner*—David N Spector
(74) *Attorney, Agent, or Firm*—J.C. Patents (57) ABSTRACT

A fixed-focus lens including a first lens group, a second lens group and a third lens group, which are arranged in sequence from an object side to an image side, is provided. The first lens group has a negative refractive power and includes three lenses arranged from the object side to the image side. The lens, closest to the object side, of the first lens group is an aspheric lens. The second lens group has a positive refractive power and includes two lens arranged from the object side to the image side. The third lens group has a positive refractive power and includes six lenses arranged from the object side to the image side. Refractive powers of the lenses of the third lens group in sequence from the object side to the image side are negative, positive, negative, positive, positive and positive.

12 Claims, 9 Drawing Sheets

FIXED-FOCUS LENS

CROSS-REFERENCE TO RELATED APPLICATION

This application claims the priority benefit of Taiwan application serial no. 96120516, filed on Jun. 7, 2007. All disclosure of the Taiwan application is incorporated herein by reference.

BACKGROUND OF THE INVENTION

1. Field of the Invention

The present invention generally relates to a lens, and, more particularly, to a fixed-focus lens.

2. Description of Related Art

Figure 1:
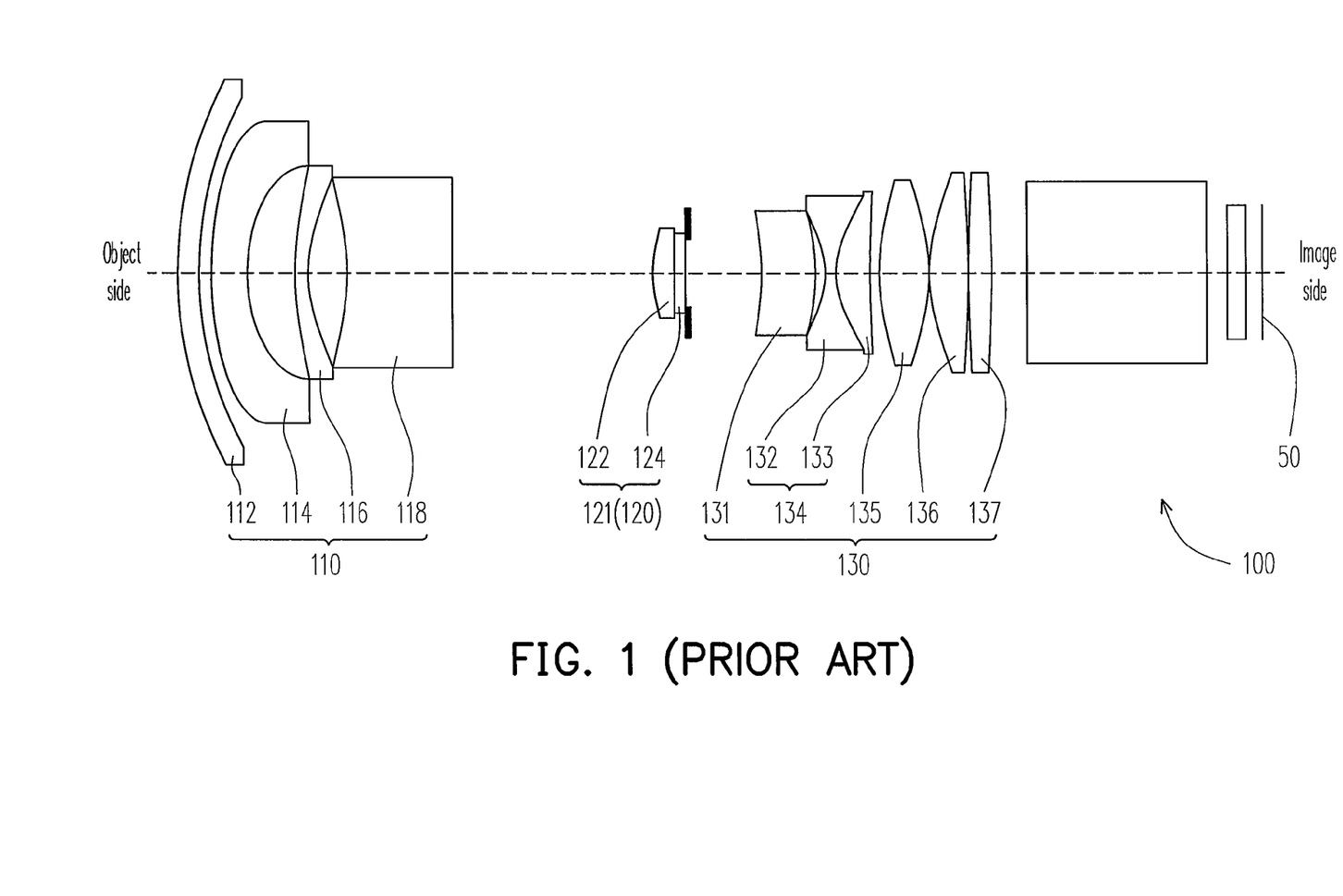
FIG. 1 is a diagram showing the structure of a conventional fixed-focus lens for a rear projection television.

Referring to FIG. 1, a conventional fixed-focus lens 100 for a rear projection television (RPTV) is disclosed in U.S. Pat. No. 6,452,728. The fixed-focus lens 100 includes a first lens group 110, a second lens group 120 and a third lens group 130 arranged in sequence from an object side to an image side. A light valve 50 is disposed on the image side. The first lens group 110 includes four lenses 112, 114, 116 and 118 all having negative refractive powers. The lens 112 is an aspheric lens. The second lens group 120 includes two lenses 122 and 124. The lenses 122 and 124 have positive and negative refractive powers, respectively, and the lenses 122 and 124 constitute a cemented lens 121. The third lens group 130 includes six lenses 131, 132, 133, 135, 136 and 137. Refractive powers of these six lenses 131, 132, 133, 135, 136 and 137 in sequence from the object side to the image side are positive, negative, positive, positive, positive and positive. In addition, the lenses 132 and 133 constitute a cemented lens 134, and the lens 137 is an aspheric lens.

In the fixed-focus lens 100, because the third lens group 130 is close to the light valve 50 and the light valve 50 is close to a light source (not shown) generating heat, the third lens group 130 normally has a higher temperature relative to other lens groups. In general, the lenses of the third lens group 130 are made of glass to resist the high temperature. However, the last lens 137 of the third lens group 130 is an aspheric lens, and the cost of the fixed-focus lens 100 is increased when a glass aspheric lens, which is more expansive, is adopted as the lens 137. If a plastic aspheric lens, which is less expensive, is adopted as the lens 137 for reducing the cost, the lens 137 is easy to deform under the high temperature so that the reliability of the fixed-focus lens 100 is worse.

SUMMARY OF THE INVENTION

Accordingly, the present invention provides a fixed-focus lens capable of reducing production cost and producing preferred imaging quality.

Other advantages of the present invention can be readily understood through the technical features disclosed in the present invention.

To achieve a part of, parts of or all of the forgoing advantages or other advantages, an embodiment of the present invention provides a fixed-focus lens including a first lens group, a second lens group and a third lens group. The first lens group has a negative refractive power and includes a first lens, a second lens and a third lens arranged in sequence from an object side to an image side. The first lens is an aspheric lens. The second lens group is disposed between the first lens group and the image side, and has a negative refractive power. The second lens group includes two lenses arranged from the object side to the image side. The third lens group is disposed between the second lens group and the image side, and has a positive refractive power. The third lens group includes six lenses arranged from the object side to the image side, and refractive powers of these lenses of the third lens group in sequence from the object side to the image side are negative, positive, negative, positive, positive and positive. In addition, the fixed-focus lens satisfies the three following conditions: (i) $0.2 < |F_1|/F < 3$, (ii) $0.5 < F_2/F < 3$ and (iii) $0.5 < F_3/F < 3.5$, where F is the effective focal length of the fixed-focus lens, $F_1$ is the effective focal length of the first lens group, $F_2$ is the effective focal length of the second lens group, and $F_3$ is the effective focal length of the third lens group.

Compared with the conventional fixed-focus lens, the aspheric lens in the fixed-focus lens of the present invention is disposed in the first lens group which is disposed further away from the image side. When the fixed-focus lens of the present invention is applied to a projection system, the first lens group has a lower temperature because the first lens group is disposed further away from the light source. Therefore, the aspheric lens of the first lens group has more design flexibility. For example, the aspheric lens may be made of plastic material, so as to lower the production cost of the fixed-focus lens. Additionally, the fixed-focus lens of the present invention has better imaging quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Reference will now be made in detail to the present preferred embodiments of the invention, examples of which are illustrated in the accompanying drawings. Wherever possible, the same reference numbers are used in the drawings and the description to refer to the same or like parts.

Figure 2:
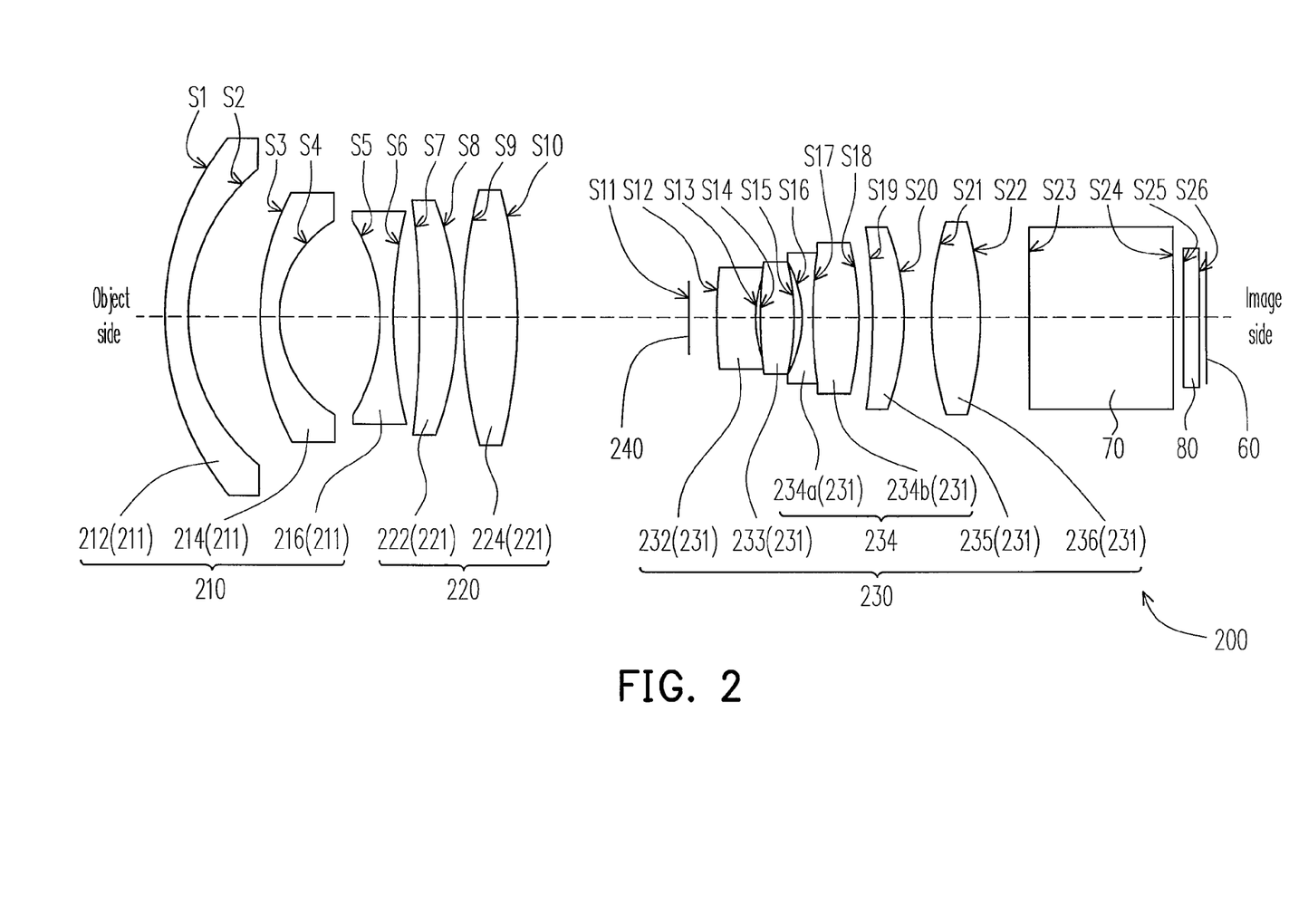
FIG. 2 is a diagram showing the structure of a fixed-focus lens according to an embodiment of the present invention.

Referring to FIG. 2, a fixed-focus lens 200 according to an embodiment of the present invention includes a first lens group 210, a second lens group 220 and a third lens group 230. The first lens group 210 has a negative refractive power, and includes three lenses 211 arranged from an object side to an image side. The lens 211, closest to the object side, of the first lens group 210 is an aspheric lens. In the present embodiment, the lenses 211 of the first lens group 210 in sequence from the object side to the image side are a first lens 212, a second lens 214 and a third lens 216. Refractive powers of the first lens 212, the second lens 214 and the third lens 216 are, for example, all negative, and the first lens 212 is an aspheric lens. Furthermore, in the present embodiment, each of the first lens 212 and the second lens 214 is a convex-concave lens with a convex surface facing the object side, and the third lens 216 is a biconcave lens, for example.

The second lens group 220 is disposed between the first lens group 210 and the image side, and has a positive refractive power. The second lens group 220 includes two lenses 221 arranged from the object side to the image side. In the present embodiment, the lenses 221 of the second lens group 220 in sequence arranged from the object side to the image side are, for example, a fourth lens 222 and a fifth lens 224. Refractive powers of the fourth lens 222 and the fifth lens 224 are both positive, for example. Moreover, in the present embodiment, the fourth lens 222 is a concave-convex lens with a convex surface facing the image side, and the fifth lens 224 is a biconvex lens, for example.

The third lens group 230 is disposed between the second lens group 220 and the image side, and has a positive refractive power. The third lens group 230 includes six lenses 231 arranged from the object side to the image side. Furthermore, Refractive powers of the lenses 231 of the third lens group 230 in sequence from the object side to the image side are negative, positive, negative, positive, positive and positive. In the present embodiment, the six lenses 231 of the third lens group 230 in sequence arranged from the object side to the image side are, for example, a sixth lens 232, a seventh lens 233, an eighth lens 234a, a ninth lens 234b, a tenth lens 235 and an eleventh lens 236, and the eighth lens 234a and the ninth lens 234b constitute a cemented lens 234. Additionally, in the present embodiment, the sixth lens 232 to the eleventh lens 236 are, in sequence, a convex-concave lens with a convex surface facing the object side, a biconvex lens, a biconcave lens, a biconvex lens, a concave-convex lens with a convex surface facing the image side and a biconvex lens, for example.

In general, an image processing device 60 is disposed on the image side. The image processing device 60 in the present embodiment is a light valve, for example. In addition, the fixed-focus lens 200 in the present embodiment is capable of forming an image provided by the image processing device 60 on the object side. Moreover, the fixed-focus lens 200 further includes an aperture stop 240 disposed between the second lens group 220 and the third lens group 230.

Besides, the fixed-focus lens 200 satisfies the following three conditions: (i) $0.2<|F_1|/F<3$, (ii) $0.5<F_2/F<3$ and (iii) $0.5<F_3/F<3.5$, where F is the effective focal length of the fixed-focus lens 200, $F_1$ is the effective focal length of the first lens group 210, $F_2$ is the effective focal length of the second lens group 220, and $F_3$ is the effective focal length of the third lens group 230.

Compared with the conventional fixed-focus lens 100 (as shown in FIG. 1), the aspheric lens (i.e. the first lens 212) of the fixed-focus lens 200 of the present embodiment is disposed in the first lens group 210 which is located further away from the image side. When the fixed-focus lens 200 is applied to a projection system, the first lens group 210 has a lower temperature because the first lens group 210 is disposed further away from the image processing device 60 on the image side and the light source (not shown) close to the image processing device 60. Therefore, the aspheric lens (i.e. the first lens 212) in the first lens group 210 has more design flexibility. For example, the aspheric lens (i.e. the first lens 212) may be made of plastic material, so as to reduce the production cost of the fixed-focus lens 200.

In the following, an embodiment of the fixed-focus lens 200 is provided. It should be noted that the listed data in Table 1 and 2 below is not intended to limit the present invention. Anyone skilled in the art may suitably modify the parameters or settings after referring to the present invention, which is still considered as within the scope of the present invention.

TABLE 1

| Surface | Radius of curvature (mm) | Interval (mm) | Refractive index | Abbe number | Remarks |
|---|---|---|---|---|---|
| S1 | 63.744 | 5.754 | 1.49 | 57.4 | First lens |
| S2 | 34.052 | 11.319 | | | |
| S3 | 57.500 | 2.960 | 1.85 | 23.8 | Second lens |
| S4 | 22.849 | 19.966 | | | |
| S5 | −32.613 | 3.623 | 1.56 | 60.7 | Third lens |
| S6 | 94.785 | 4.354 | | | |
| S7 | −317.880 | 9 | 1.85 | 23.8 | Fourth lens |
| S8 | −62.062 | 1.599 | | | |
| S9 | 71.958 | 10.918 | 1.8 | 46.6 | Fifth lens |
| S10 | −99.464 | 38.877 | | | |
| S11 | Infinite | 3.206 | | | Aperture stop |
| S12 | 75.521 | 6.529 | 1.76 | 27.5 | Sixth lens |
| S13 | 37.528 | 0.585 | | | |
| S14 | 73.463 | 6.292 | 1.72 | 50.2 | Seventh lens |
| S15 | −38.867 | 0.780 | | | |
| S16 | −25.930 | 2.958 | 1.72 | 29.5 | Eighth lens |
| S17 | 43.853 | 8.373 | 1.5 | 81.5 | Ninth lens |
| S18 | −35.602 | 4.122 | | | |
| S19 | −183.014 | 6.192 | 1.5 | 81.5 | Tenth lens |
| S20 | −57.764 | 5.020 | | | |
| S21 | 75.730 | 9.008 | 1.77 | 49.6 | Eleventh lens |

TABLE 1-continued

| Surface | Radius of curvature (mm) | Interval (mm) | Refractive index | Abbe number | Remarks |
|---|---|---|---|---|---|
| S22 | −70.937 | 7.080 | | | |
| S23 | Infinite | 26 | 1.52 | 64.2 | Total internal reflection prism |
| S24 | Infinite | 2 | | | |
| S25 | Infinite | 3 | 1.49 | 70.4 | Cover glass |
| S26 | Infinite | 0.483 | | | |

TABLE 2

| Aspheric parameter | Conic surface coefficient k | Coefficient $A_2$ | Coefficient $A_4$ | Coefficient $A_6$ | Coefficient $A_8$ |
|---|---|---|---|---|---|
| S1 | −2.58414 | 2.65156E−06 | −1.17605E−09 | 1.32484E−12 | −2.68034E−16 |
| S2 | −2.42926 | 5.17045E−06 | −7.76717E−09 | 6.88991E−12 | −2.60345E−15 |

In Table 1, "interval" refers to the straight-line distance along the main axis of two adjacent surfaces. For example, the interval of the surface S1 is the straight-line distance along the main axis from the surface S1 to the surface S2. As for the magnitudes of thickness, refractive index and Abbe number of the lenses listed in the remarks field, refer to the values of the interval, the refractive index and the Abbe number in the same row. Additionally, in Table 1, the surfaces S1 and S2 are the two surfaces of the first lens 212, the surfaces S3 and S4 are the two surfaces of the second lens 214, and the surfaces S5 and S6 are the two surfaces of the third lens 216. The surfaces S7 and S8 are the two surfaces of the fourth lens 222, and the surfaces S9 and S10 are the two surfaces of the fifth lens 224. The surface S11 is the aperture stop 240. The surfaces S12 and S13 are the two surfaces of the sixth lens 232, and the surfaces S14 and S15 are the two surfaces of the seventh lens 233. The surface S16 is the surface of the eighth lens 234a facing the object side, the surface S17 is the connecting surface of the eighth lens 234a and the ninth lens 234b, and the surface S18 is the surface of the ninth lens 234b facing the image side. The surfaces S19 and S20 are the two surfaces of the tenth lens 235, and the surfaces S21 and S22 are the two surfaces of the eleventh lens 236. The surfaces S23 and S24 are the two surfaces of a total internal reflection (TIR) prism 70, and the surfaces S25 and S26 are the two surfaces of a cover glass 80 for protecting the image processing device 60. In Table 1, the value filled in the interval field in the row whose surface field is S26 is the distance from the surface S26 to the image processing device 60.

The parameters such as the radius of curvature and the interval of each surface are given in Table 1, and will not be repeated herein again.

The surfaces S1 and S2 are aspheric and are represented by the following formula:

$$Z = \frac{cr^2}{1+\sqrt{1-(1+k)c^2r^2}} + A_1 r^2 + A_2 r^4 + A_3 r^6 + A_4 r^8 + A_5 r^{10} + \ldots$$

In the formula, Z is the sag in the optical axis direction, and c is the inverse of the radius of the osculating sphere. In other words, c is the inverse of the radius of curvature (such as the radius of curvature of S1 and S2 in Table 1) close to the optical axis. k is the conic surface coefficient, r is the aspheric height, that is, the height from the center of the lens to its edge, and $A_1, A_2, A_3, A_4, A_5 \ldots$ are aspheric coefficients, where the coefficients $A_1, A_3, A_5$ and $A_7$ are 0. Table 2 lists the parameters of the surface S1 and the surface S2.

The fixed-focus lens 200 has preferred imaging quality. In other words, the correction of imaging aberration of the fixed-focus lens 200 is relatively accurate and the ghost image is effectively suppressed. In addition, even when the imaging resolution is high, the fixed-focus lens 200 still reduces the degree of aberration and distortion. In the following, optical simulation data are used to prove the above advantages of the fixed-focus lens 200.

Figure 3A:
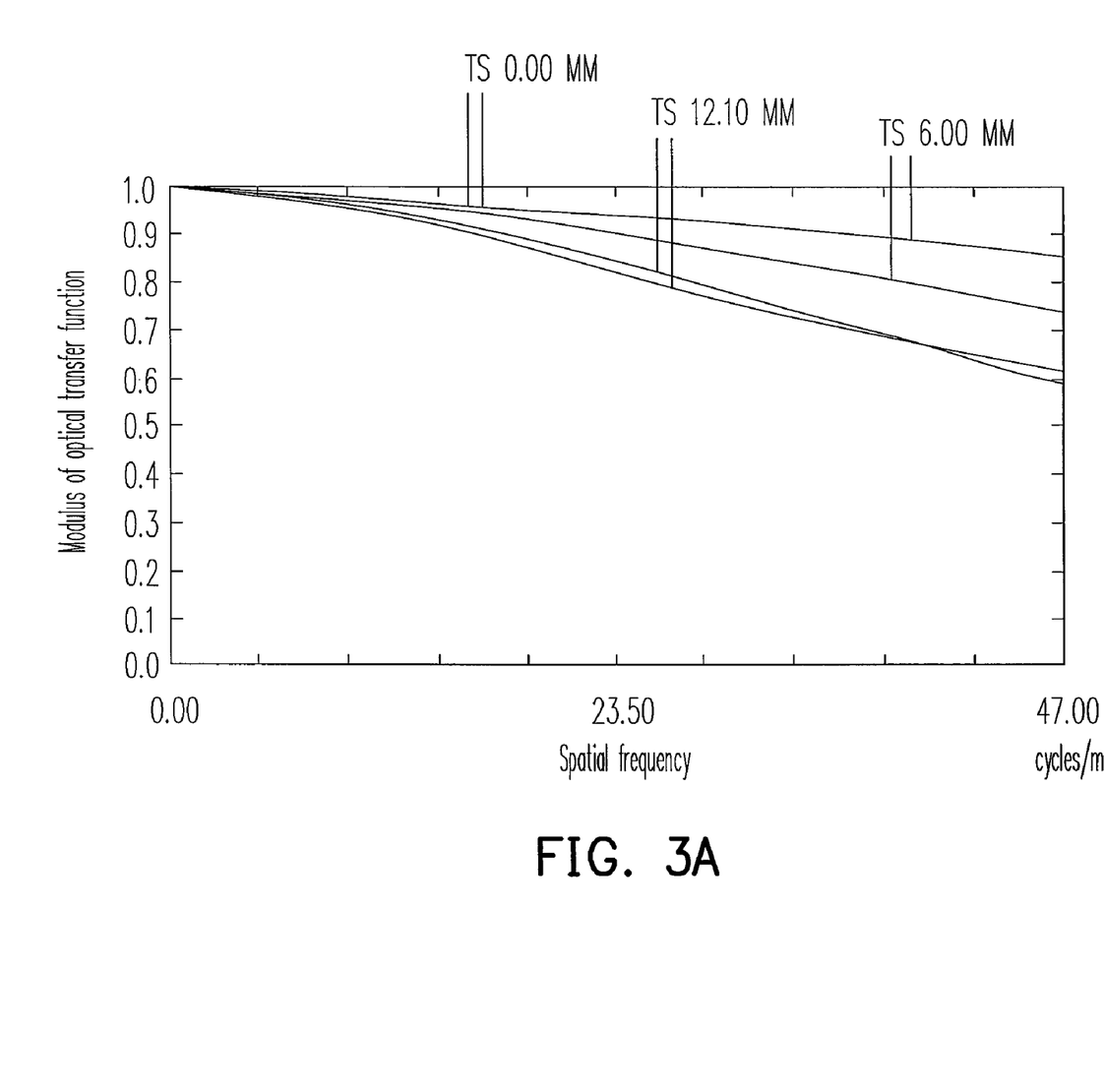
FIGS. 3A to 3C are diagrams showing the optical simulation data of imaging of the fixed-focus lens in FIG. 2.
Figure 3B:
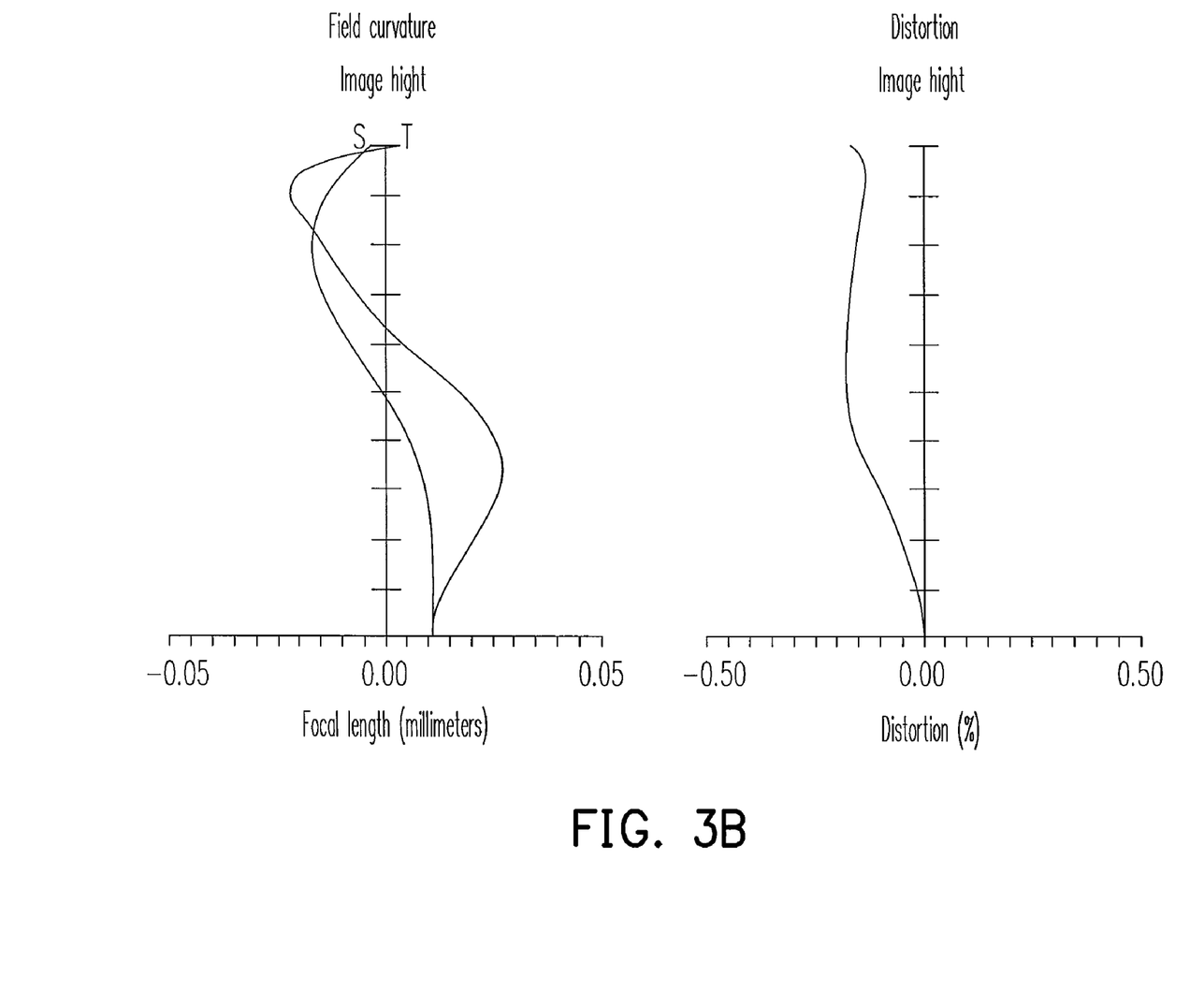
Figure 3C:
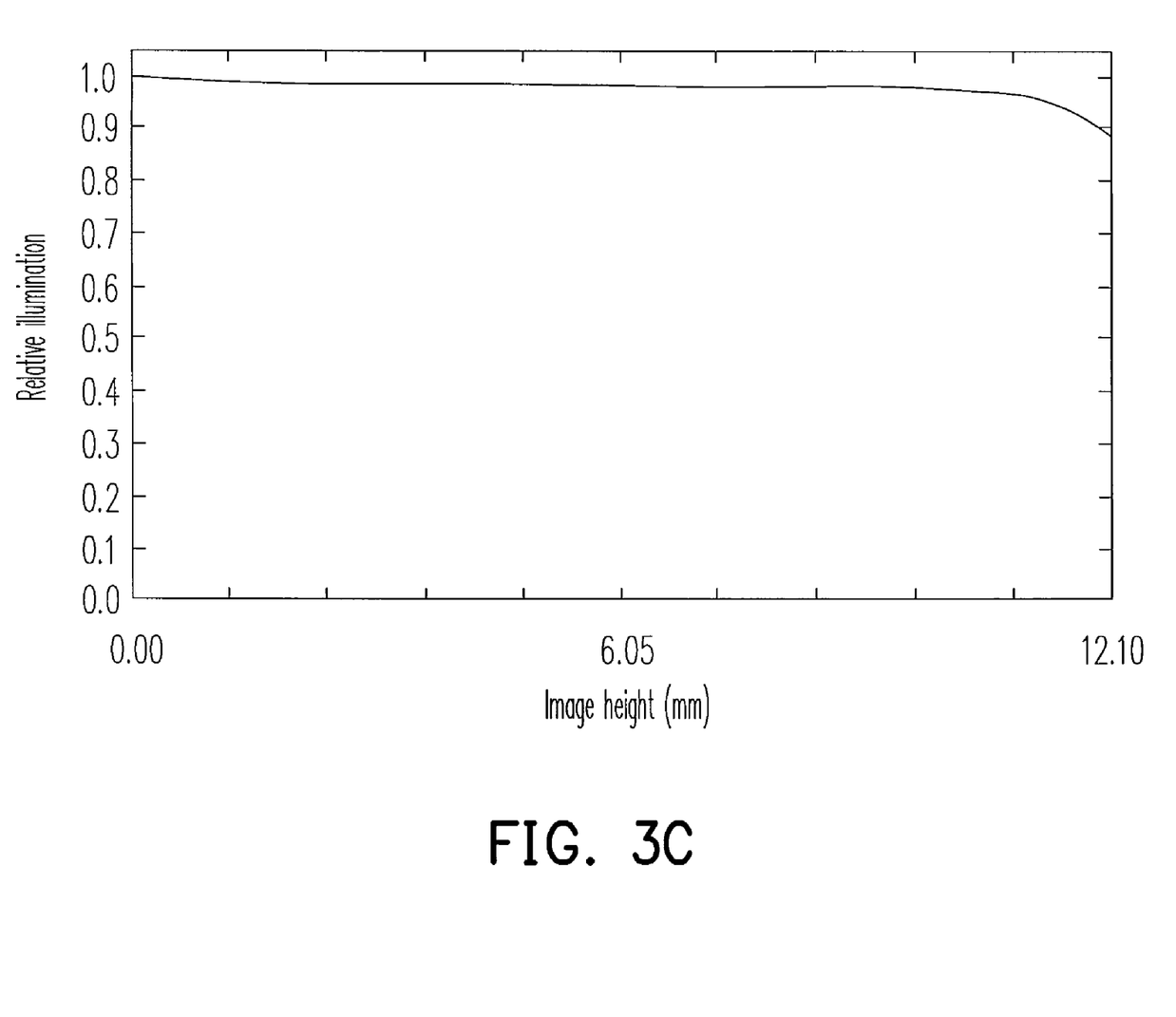

FIGS. 3A to 3C are diagrams showing the optical simulation data of imaging of the fixed-focus lens in FIG. 2. Referring to FIGS. 3A to 3C, FIG. 3A is the diagram showing the curve of a modulation transfer function (MTF). The horizontal axis represents a spatial frequency in cycles per millimeter, and the vertical axis represents a modulus of the optical transfer function (OTF). It can be understood from FIG. 3A that the OTF is still greater than 58% when the spatial frequency is 47 cycles/mm. As shown in FIG. 3B, the diagram on the left shows the field curvature, and the diagram on the right shows the distortion, wherein the maximum field is 36.719, the reference wavelength is 550 nm and the distortion rate is within ±0.2%. FIG. 3C is a diagram showing the relative illumination of an image on the image processing device 60 formed by the fixed-focus lens 200 from a virtual picture with uniform brightness on the object side, wherein the horizontal axis represents the image height and the vertical axis represents the relative illumination. As shown in FIG. 3C, the relative illumination is greater than 85%. Accordingly, the curves in FIGS. 3A to 3C are within the standard range. Therefore, the capacity of the fixed-focus lens 200 for producing a preferred imaging quality is proved.

In general, the price of an aspheric lens is higher than a spherical lens. Compared with the conventional fixed-focus lens 100 (as shown in FIG. 1) that uses two aspheric lenses, the fixed-focus lens 200 of the present embodiment uses only one aspheric lens to produce preferred imaging quality. Therefore, the fixed-focus lens 100 of the present embodiment has both a preferred imaging quality and a low production cost.

Figure 4:
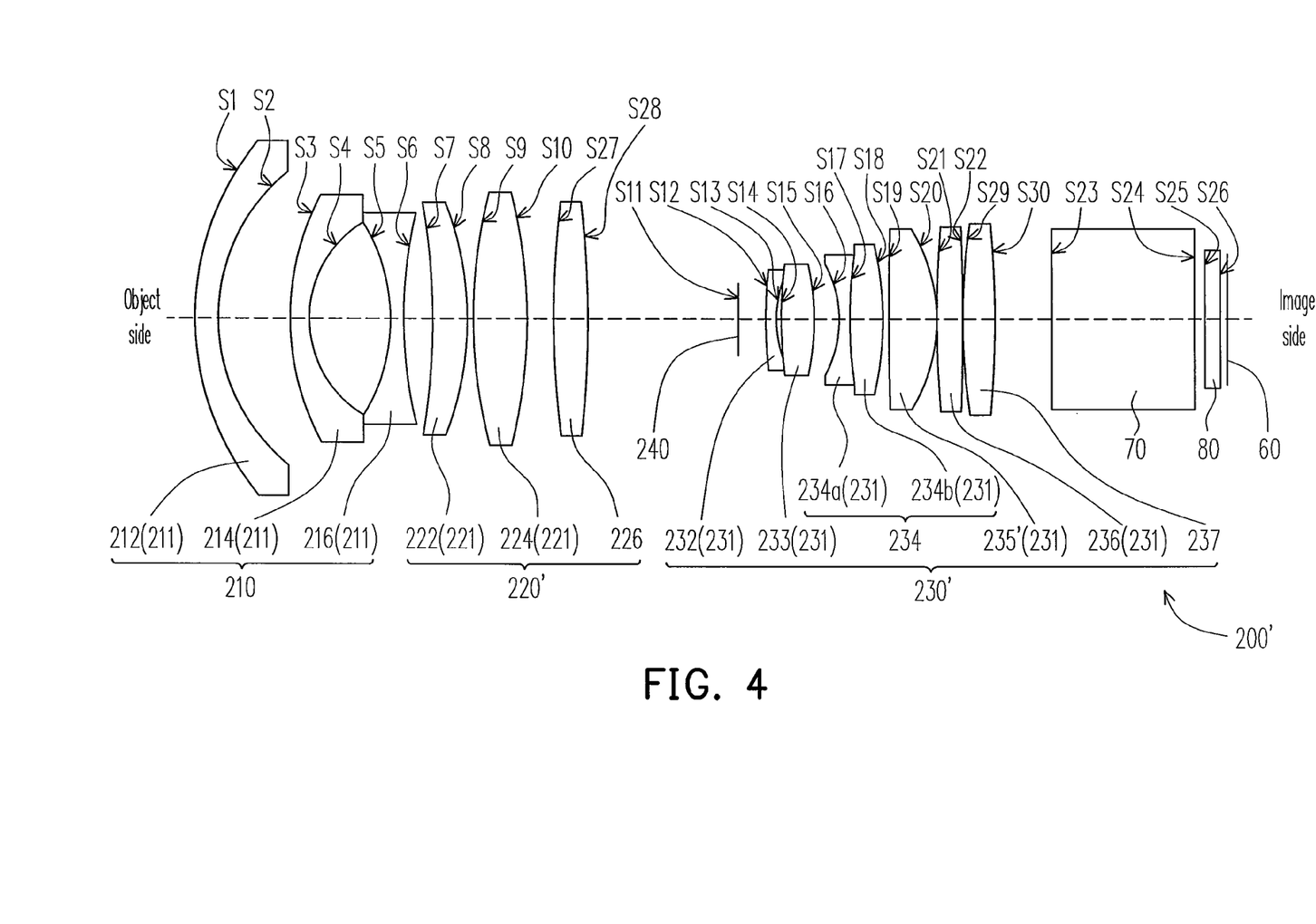
FIG. 4 is a diagram showing the structure of a fixed-focus lens according to another embodiment of the present invention.

Referring to FIG. 4, a fixed-focus lens 200' according to another embodiment of the present invention is similar to the above fixed-focus lens 200 (as shown in FIG. 2) except for the differences described below. A second lens group 220' of the fixed-focus lens 200' further includes a twelfth lens 226 disposed between the fifth lens 224 and a third lens group 230', and the twelfth lens 226 has a positive refractive power. More particularly, the twelfth lens 226 is a biconvex lens, for example. In addition, the third lens group 230' further includes a thirteenth lens 237 disposed between the eleventh lens 236 and the image side, and the thirteenth lens 237 has a positive refractive power. More particularly, the thirteenth lens 237 is a biconvex lens, for example. Furthermore, in the present embodiment, a tenth lens 235' of the third lens group 230' is a biconvex lens, for example. The fixed-focus lens 200' in the present embodiment has advantages and functions of the above fixed-focus lens 200 (as shown in FIG. 2), and the details will not be repeated herein again.

In the following, an embodiment of the fixed-focus lens 200' is provided, but the embodiment should not be used to limit the present invention. Please refer to FIG. 3 and Tables 3 and 4.

TABLE 3

| Surface | Radius of curvature (mm) | Interval (mm) | Refractive index | Abbe number | Remarks |
|---|---|---|---|---|---|
| S1 | 64.994 | 6 | 1.49 | 57.4 | First lens |
| S2 | 36.311 | 13.658 | | | |
| S3 | 66.277 | 2.844 | 1.85 | 23.8 | Second lens |
| S4 | 21.885 | 14.609 | | | |
| S5 | −34.088 | 2.8 | 1.61 | 58.7 | Third lens |
| S6 | 129.801 | 5.098 | | | |
| S7 | −107.954 | 6.482 | 1.78 | 25.7 | Fourth lens |
| S8 | −57.613 | 0.2 | | | |
| S9 | 81.278 | 10.920 | 1.79 | 44.2 | Fifth lens |
| S10 | −87.918 | 0.2 | | | |
| S27 | 101.790 | 7.012 | 1.62 | 36.3 | Twelfth lens |
| S28 | −476.597 | 33.487 | | | |
| S11 | Infinite | 4.478 | | | Aperture stop |
| S12 | 49.645 | 2.001 | 1.8 | 35 | Sixth lens |
| S13 | 29.161 | 0.975 | | | |
| S14 | 118.490 | 5.096 | 1.69 | 53.2 | Seventh lens |
| S15 | −49.464 | 3.426 | | | |
| S16 | −20.840 | 1.7 | 1.73 | 28.5 | Eighth lens |
| S17 | 75.754 | 7.578 | 1.5 | 81.5 | Ninth lens |
| S18 | −30.030 | 2.210 | | | |
| S19 | 111.204 | 8.780 | 1.5 | 81.5 | Tenth lens |
| S20 | −35.548 | 0.476 | | | |
| S21 | 1757.510 | 5.290 | 1.74 | 49.3 | Eleventh lens |
| S22 | −115.333 | 0.204 | | | |
| S29 | 94.406 | 5.605 | 1.77 | 49.5 | Thirteenth lens |
| S30 | −1105.175 | 7.003 | | | |
| S23 | Infinite | 26 | 1.52 | 64.2 | Total internal reflection prism |
| S24 | Infinite | 2 | | | |
| S25 | Infinite | 3 | 1.49 | 70.4 | Cover glass |
| S26 | Infinite | 0.483 | | | |

TABLE 4

| Aspheric parameter | Conic surface coefficient k | Coefficient $A_2$ | Coefficient $A_4$ | Coefficient $A_6$ | Coefficient $A_8$ |
|---|---|---|---|---|---|
| S1 | −1.76967 | 2.93298E−06 | −1.36180E−09 | 1.75937E−12 | −4.54364E−16 |
| S2 | −2.71936 | 6.07925E−06 | −6.89336E−09 | 7.05999E−12 | −3.39019E−15 |

In Table 3, the surfaces S1~S18 and the surfaces S21~S26 are identical to the ones in Table 1. The surfaces S19 and S20 are the two surfaces of the tenth lens 235', the surfaces S27 and S28 are the two surfaces of the twelfth lens 226, and the surfaces S29 and S30 are the two surfaces of the thirteenth lens 237.

Figure 5A:
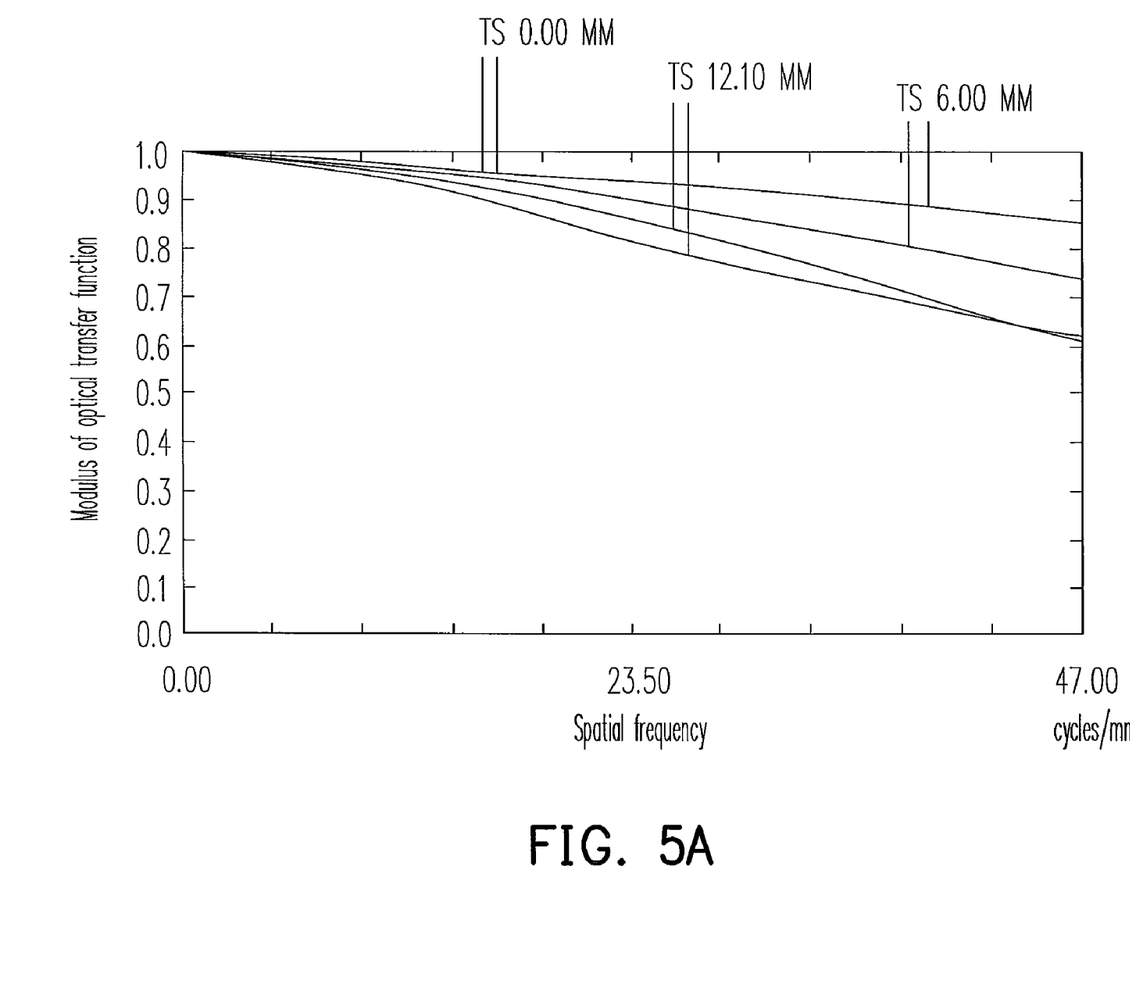
FIGS. 5A to 5C are diagrams showing the optical simulation data of imaging of the fixed-focus lens in FIG. 4.
Figure 5B:
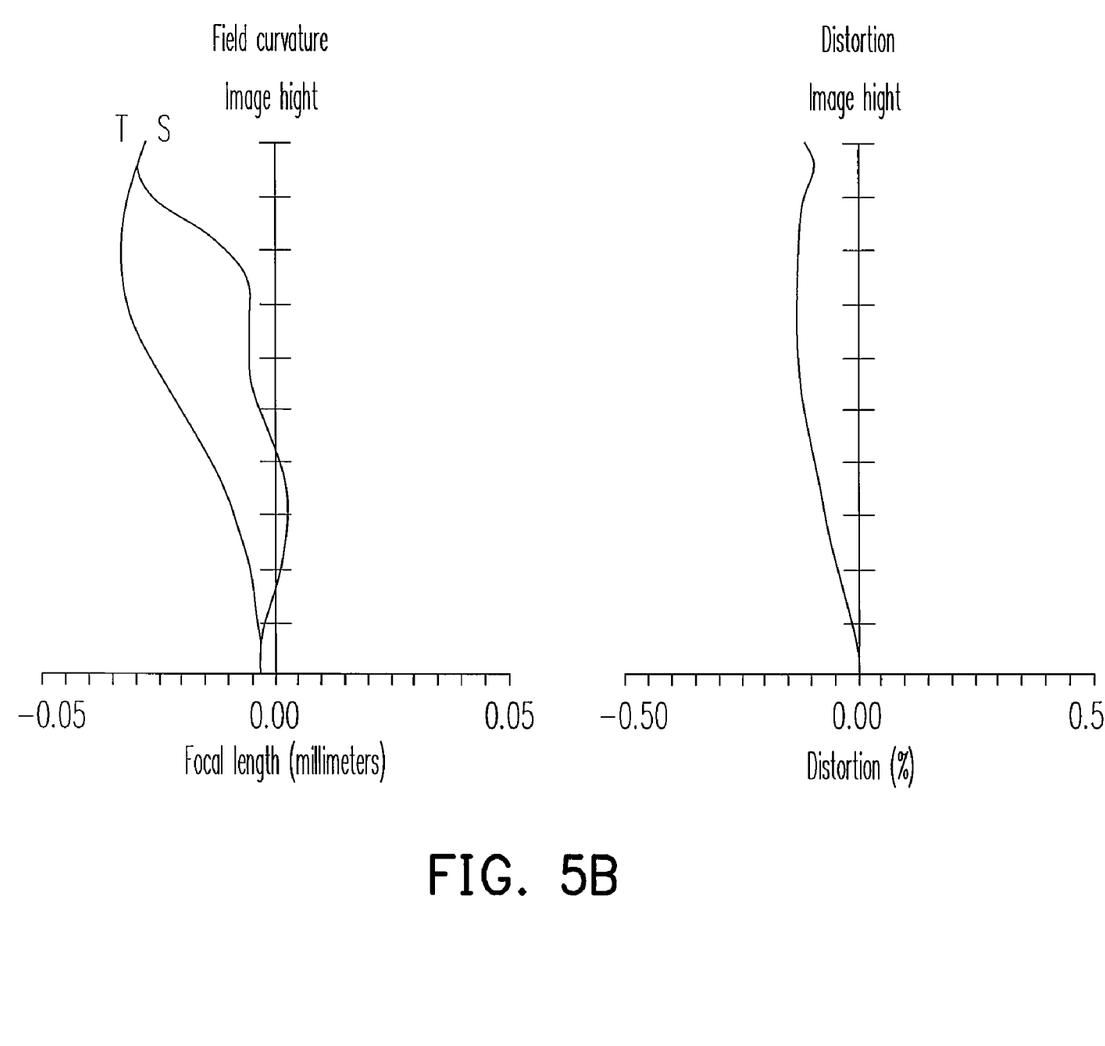
Figure 5C:
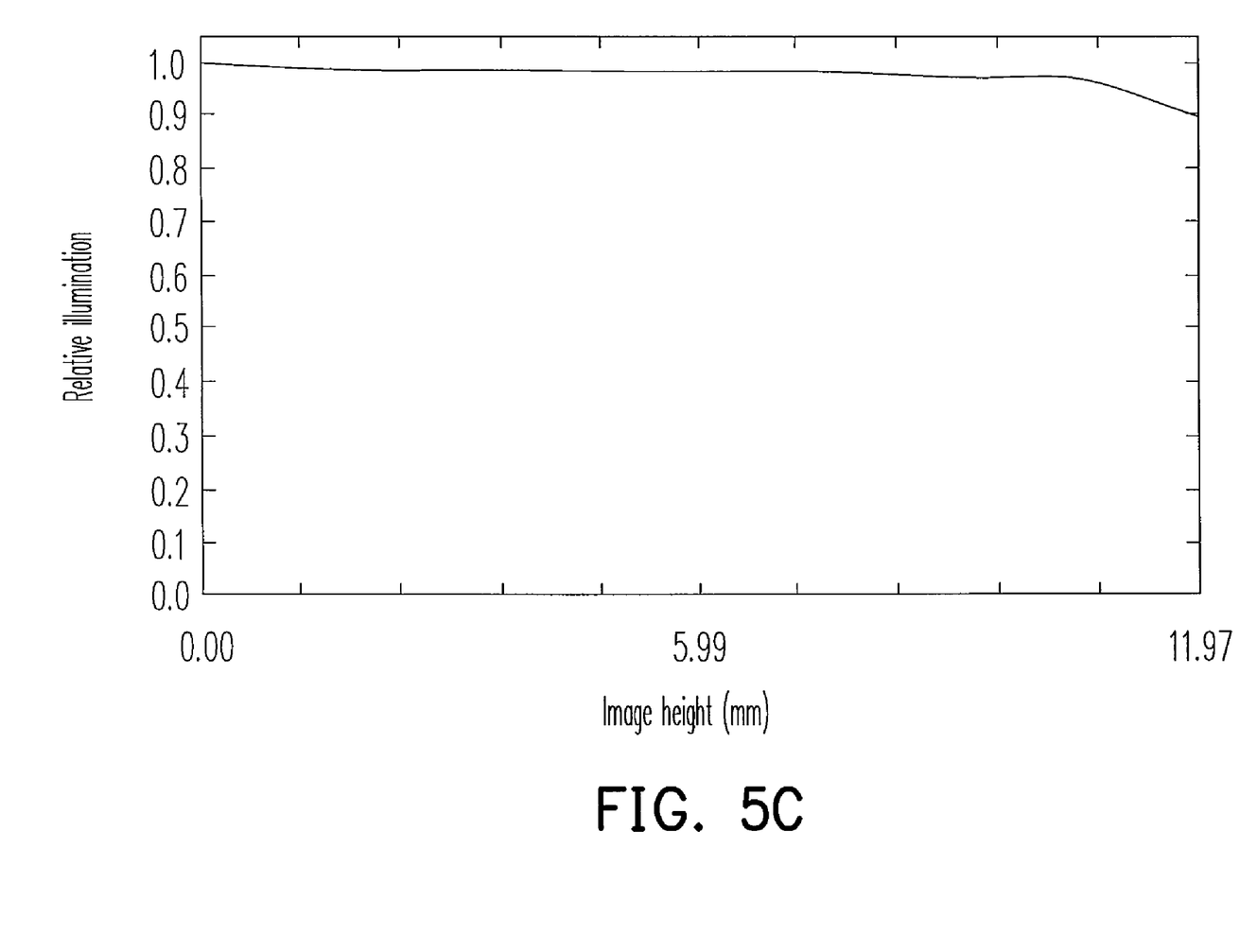

FIGS. 5A to 5C are diagrams showing the optical simulation data of imaging of the fixed-focus lens in FIG. 4. Referring to FIGS. 5A to 5C, FIG. 5A is the diagram showing the curve of a MTF. The horizontal axis represents a spatial frequency in cycles per millimeter, and the vertical axis represents a modulus of the OTF. It can be understood from FIG. 5A that the OTF is still greater than 59% when the spatial frequency is 47 cycles/mm. As shown in FIG. 5B, the diagram on the left shows the field curvature, and the diagram on the right shows the distortion, wherein the maximum field is 36.933, the reference wavelength is 550 nm and the distortion rate is within ±0.2%. FIG. 5C is a diagram showing the relative illumination of an image on the image processing device 60 formed by the fixed-focus lens 200' from a virtual picture with uniform brightness on the object side, wherein the horizontal axis represents the image height and the vertical axis represents the relative illumination. As shown in FIG. 5C, the relative illumination is greater than 85%. Accordingly, the curves in FIGS. 5A to 5C are within the standard range. Therefore, the capacity of the fixed-focus lens 200' for producing a preferred imaging quality is proved.

In summary, compared with the conventional fixed-focus lens, the aspheric lens of the fixed-focus lens in the present invention is disposed in the first lens group which is located further away from the image side. When the fixed-focus lens in the present invention is applied to a projection system, the first lens group has a lower temperature because the first lens group is disposed further away from the light source. Therefore, the aspheric lens in the first lens group has more design flexibility. For example, the aspheric lens is made of plastic material, so as to reduce the production cost of the fixed-focus lens.

Additionally, the fixed-focus lens in the present invention has preferred imaging quality. In other words, the correction of imaging aberration of the fixed-focus lens is relatively accurate, and the ghost image is effectively suppressed. Moreover, even when the imaging resolution is high, the fixed-focus lens is still able to efficiently reduce the degree of aberration and distortion. Furthermore, compared with the conventional fixed-focus lens that uses two aspheric lenses, the fixed-focus lens in the present invention may use only one aspheric lens, which is enough to produce preferred imaging quality. Therefore, the fixed-focus lens in the present embodiment has the advantages of both a preferred imaging quality and a low production cost.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, comprising:
   a first lens group, having a negative refractive power, and comprising a first lens, a second lens and a third lens arranged in sequence from an object side to an image side, wherein the first lens is an aspheric lens;
   a second lens group, disposed between the first lens group and the image side and having a positive refractive power, the second lens group comprising two lenses arranged from the object side to the image side; and
   a third lens group, disposed between the second lens group and the image side and having a positive refractive power, the third lens group comprising six lenses arranged from the object side to the image side, wherein refractive powers of the lenses of the third lens group in sequence from the object side to the image side are negative, positive, negative, positive, positive and positive,
   wherein F is an effective focal length of the fixed-focus lens, $F_1$ is an effective focal length of the first lens group, $F_2$ is an effective focal length of the second lens group, $F_3$ is an effective focal length of the third lens group, and $0.2<|F_1|/F<3$, $0.5<F_2/F<3$, and $0.5<F_3/F<3.5$.

2. The fixed-focus lens according to claim 1, wherein refractive powers of the first lens, the second lens and the third lens are all negative.

3. The fixed-focus lens according to claim 2, wherein each of the first lens and the second lens is a convex-concave lens with a convex surface facing the object side, and the third lens is a biconcave lens.

4. The fixed-focus lens according to claim 1, wherein the lenses of the second lens group in sequence from the object side to the image side are a fourth lens and a fifth lens, and refractive powers of the fourth lens and the fifth lens are both positive.

5. The fixed-focus lens according to claim 4, wherein the fourth lens is a concave-convex lens with a convex surface facing the image side, and the fifth lens is a biconvex lens.

6. The fixed-focus lens according to claim 4, wherein the second lens group further comprises a twelfth lens disposed between the fifth lens and the third lens group, and the twelfth lens has a positive refractive power.

7. The fixed-focus lens according to claim 6, wherein the fourth lens is a concave-convex lens with a convex surface facing the image side, and the fifth lens and the twelfth lens are both biconvex lenses.

8. The fixed-focus lens according to claim 1, wherein the lenses of the third lens group in sequence from the object side to the image side are a sixth lens, a seventh lens, an eighth lens, a ninth lens, a tenth lens and an eleventh lens, and the eighth lens and the ninth lens constitute a cemented lens.

9. The fixed-focus lens according to claim 8, wherein the sixth lens, the seventh lens, the eighth lens, the ninth lens, the tenth lens and the eleventh lens are, in sequence, a convex-concave lens with a convex surface facing the object side, a biconvex lens, a biconcave lens, a biconvex lens, a concave-convex lens with a convex surface facing the image side and a biconvex lens.

10. The fixed-focus lens according to claim 8, wherein the third lens group further comprises a thirteenth lens disposed between the eleventh lens and the image side, and the thirteenth lens has a positive refractive power.

11. The fixed-focus lens according to claim 10, wherein the sixth lens, the seventh lens, the eighth lens, the ninth lens, the tenth lens and the eleventh lens are, in sequence, a convex-concave lens with a convex surface facing the object side, a biconvex lens, a biconcave lens, a biconvex lens, a biconvex lens and a biconvex lens, and the thirteenth lens is a biconvex lens.

12. The fixed-focus lens according to claim 1, further comprising an aperture stop disposed between the second lens group and the third lens group.

* * * * *